Dec. 26, 1950          J. VINTON          2,535,378

COFFEE MAKER

Filed Nov. 1, 1948

INVENTOR.
John Vinton

BY

ATTORNEY

Patented Dec. 26, 1950

2,535,378

UNITED STATES PATENT OFFICE 2,535,378

COFFEE MAKER

John Vinton, San Francisco, Calif.

Application November 1, 1948, Serial No. 57,747

2 Claims. (Cl. 99—314)

This invention relates to a coffee maker, and particularly to a coffee maker of the type in which the water is heated, passed through the coffee grounds only once, and thereafter, the coffee extract is restrained in a compartment other than the one in which the water was first heated and out of contact with the grounds.

It is an object of my invention to provide an improved coffee maker having certain advantages as to construction, simplicity, safety, ease of cleaning and others as will appear from the following description.

Figure 1:
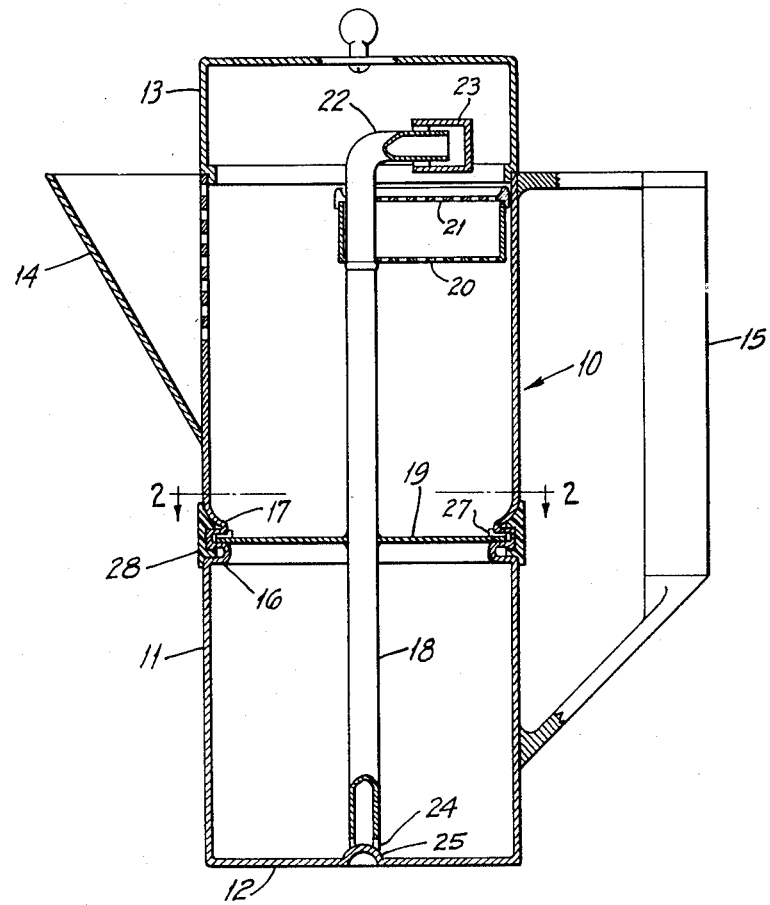
Figure 1 is a sectional elevation of the entire coffee maker.
Figure 2:
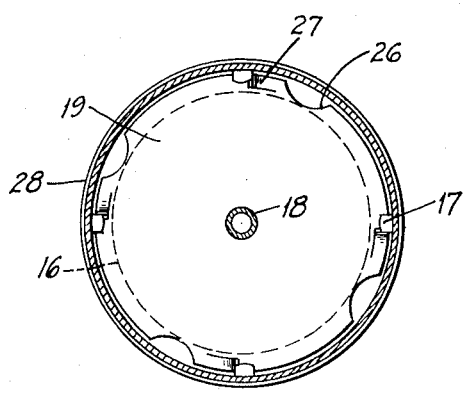
Figure 2 is a plan section on line 2—2 of Figure 1.

In the drawing, the coffee maker is referred to generally by the reference numeral 10. The specific embodiment shown is of a generally cylindrical form having sides 11, bottom 12, and removable cover 13. A pouring spout 14 and a handle 15 are provided. At a location sufficiently above the bottom of the coffee maker to accommodate the quantity of water desired, there is pressed or spun into the walls of the vessel an annular ring 16. Slightly above the ring 16 are a plurality, in this instance 4, of bosses or lugs 17.

An integral removable assembly includes a tube 18, a partition plate or disc 19, and a coffee basket 20. The basket has a removable foraminous lid or cap cover 21 having raised edges to assure that the water passes through the basket. The upper end of the tube 18 is bent over approximately at right angles in the portion 22 and secured thereto is a whistle 23 of any ordinary type. The lower end of the tube is cut away at 24 so that the locating button 25 on the bottom does not prevent liquid communication with the bottom compartment. At the outer edge of the disc 19 there are provided openings or cut-away portions 26 and spring fingers 27 equivalent in number to the lugs 17, in this instance 4.

With water in the lower compartment, coffee in the basket, and the cover 13 removed, the tube and disc assembly may be put into the vessel, the cut-away portions 26 clearing the lugs 17. The tube and disc assembly is then rotated to engage spring fingers 27 with the lugs 17 until the disc 19 is firmly held with a substantially watertight joint to the ring 16. In this position, the tube and disc assembly divides the coffee maker into a lower or water compartment, and an upper or coffee compartment. Preferably, the spring fingers are so tensioned that a pressure of 4 to 5 pounds per square inch in the lower compartment will cause the disc to be raised from the ring 16, thus avoiding any possibility of development of excess pressure or possible explosion in case the tube 18 became clogged.

The coffee maker may be placed upon a burner or hot plate and the water contained in the lower compartment heated. When a sufficiently high temperature has been reached, the vapor pressure of the water will force the water through the openings 24 up tube 18 and out through the whistle 23 to pass through the foraminous cover 21 and coffee contained in the basket 20. The arrangement at the lower end of the tube 18 is such that a small quantity of water is retained in the bottom compartment after the major portion has passed upward through the tube 18. This water will thereupon form steam sufficient to sound whistle 23, thus signaling the completion of the brewing process.

The coffee extract will remain in the upper compartment and may be kept warm by heating the small amount of water contained in the lower compartment, if desired. The water does not repeatedly pass through the coffee grounds, thus extracting undesirable constituents therefrom.

A washer, not shown, may be provided between the disc 19 and the annular ring 16, but this is not necessary if sufficient care is used in forming these meeting surfaces. A ring 28 is used to conceal the inwardly pressed annulus 16 and bosses 17 and to constitute a decorative feature, as by making it of a contrasting color. The locating button 25 is not absolutely necessary but tends to stabilize the removable assembly when this is in place in the vessel. I prefer to locate the basket 20 so that it will be out of contact with the coffee extract when the full volume of water has been used in the lower chamber.

I claim:

1. In a coffee maker, a vessel having a bottom, sides and a removable cover, an annular shoulder in the sides spaced from the bottom of the vessel and lugs above the sides of the shoulder; and a water-transfer unit consisting of a disc adapted to seat on the shoulder to divide the vessel into upper and lower chambers and a plurality of deformable spring fingers adapted to engage the lugs upon rotation of the disc to hold the disc in a water-tight relation to the shoulder and to permit the disc to move with respect to said vessel to release a pressure in excess of that required to flex said spring fingers from said lower chamber, a continuous tube passing through said disc and extending on each side thereof to provide the only communication between the lower and the upper chamber; a foraminous coffee holding means supported on said tube to receive below the upper end of said tube water issuing from the upper end of said tube for gravital flow through said foraminous coffee holder.

2. In a coffee maker, a vessel having a bottom, sides and removable cover, an annular shoulder in the sides spaced from the bottom of the vessel, and lugs in the sides above the shoulder; and a removable unit comprising a disc rotatable within the vessel and adapted to seat on the shoulder to divide the vessel into an upper and a lower water retaining chamber and including means cooperating with the lugs upon such rotation to hold the disc in water-tight relation to the shoulder, said cooperating means including spring fingers adapted to yield and permit fluid to pass in case pressure in the lower compartment reaches an excessive value, means for transferring water from the lower chamber to the upper chamber consisting of a continuous hollow tube having an imperforate side wall and extending on each side of said disc with its lower open end at substantially the bottom of the vessel and its upper end near the upper end of the vessel, and foraminous coffee holding means positioned cooperatively adjacent to the upper end of the tube to receive water flowing from the upper end of the tube and to pass the water therethrough.

JOHN VINTON.

REFERENCES CITED

The following references are of record in the file of this patent:

UNITED STATES PATENTS

| Number | Name | Date |
| --- | --- | --- |
| 129,882 | Behringer | July 30, 1872 |
| 142,195 | Blaisdell et al. | Aug. 26, 1873 |
| 225,731 | Stilwell | Mar. 23, 1880 |
| 772,498 | Chapman et al. | Oct. 18, 1904 |
| 1,188,249 | Cook | June 20, 1916 |
| 1,287,378 | Malcamp | Dec. 10, 1918 |
| 1,396,685 | Houck | Nov. 8, 1921 |
| 2,020,104 | Collin | Nov. 5, 1935 |

FOREIGN PATENTS

| Number | Country | Date |
| --- | --- | --- |
| 25,138 | Germany | Dec. 18, 1883 |
| 451,751 | Great Britain | Aug. 11, 1936 |